US010775651B2

(12) United States Patent
Dalir et al.

(10) Patent No.: US 10,775,651 B2
(45) Date of Patent: Sep. 15, 2020

(54) DOUBLE-LAYER GRAPHENE OPTICAL MODULATORS AND METHODS OF FABRICATION THEREOF

(71) Applicants: Hamed Dalir, El Cerrito, CA (US); Yang Xia, Albany, CA (US); Yuan Wang, El Cerrito, CA (US); Xiang Zhang, Alamo, CA (US)

(72) Inventors: Hamed Dalir, El Cerrito, CA (US); Yang Xia, Albany, CA (US); Yuan Wang, El Cerrito, CA (US); Xiang Zhang, Alamo, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/104,532

(22) Filed: Aug. 17, 2018

(65) Prior Publication Data
US 2019/0155068 A1    May 23, 2019

Related U.S. Application Data

(60) Provisional application No. 62/550,063, filed on Aug. 25, 2017.

(51) Int. Cl.
*G02F 1/035* (2006.01)
*G02F 1/025* (2006.01)
*G02F 1/015* (2006.01)

(52) U.S. Cl.
CPC .............. *G02F 1/035* (2013.01); *G02F 1/025* (2013.01); *G02F 2001/0157* (2013.01); *G02F 2202/10* (2013.01)

(58) Field of Classification Search
CPC ................................ G02F 1/025; G02F 1/225
USPC .......................................... 977/734; 385/1, 2
See application file for complete search history.

(56) References Cited

U.S. PATENT DOCUMENTS

| 8,554,022 | B1 | 10/2013 | Hochberg et al. |
|---|---|---|---|
| 9,360,689 | B2 | 6/2016 | Liu et al. |
| 2004/0213307 | A1 | 10/2004 | Lieber et al. |
| 2009/0235721 | A1 | 9/2009 | Robinson et al. |
| 2010/0291828 | A1 | 11/2010 | Reches et al. |
| 2011/0102068 | A1 | 5/2011 | Bouchiat et al. |
| 2011/0104442 | A1 | 5/2011 | Yoon et al. |
| 2011/0116168 | A1 | 5/2011 | Nikoobakht |
| 2013/0101247 | A1* | 4/2013 | Cho .................. G02F 1/025 385/1 |

(Continued)

OTHER PUBLICATIONS

Phare, C. T.; et al. Graphene electro-optic modulator with 30 GHz bandwidth, Nat. Photonics 2015, 9, 511-514.

(Continued)

*Primary Examiner* — Jonathan Han (57) ABSTRACT

This disclosure provides systems, methods, and apparatus related to optical modulators. In one aspect, a device includes a substrate, a first electrically insulating material disposed over the substrate, a first graphene layer and a second graphene layer disposed in the first electrically insulating material and being separated by the first electrically insulating material, and a waveguide disposed on the first electrically insulating material. At least a portion of the second graphene layer overlays at least a portion of the first graphene layer. The waveguide overlays both the first graphene layer and the second graphene layer.

18 Claims, 7 Drawing Sheets

(56) References Cited

U.S. PATENT DOCUMENTS

| | | | |
|---|---|---|---|
| 2014/0056551 A1* | 2/2014 | Liu | G02F 1/025 |
| | | | 385/2 |
| 2014/0105553 A1* | 4/2014 | Kim | G02F 1/011 |
| | | | 385/123 |
| 2016/0380121 A1* | 12/2016 | Suzuki | H01L 31/028 |
| | | | 385/2 |

OTHER PUBLICATIONS

Liu, M.; et al. Double-layer graphene optical modulator, Nano Lett. 2012, 3, 1482-1485.
Liu, M.; et al. A graphene-based broadband optical modulator, Nature 2011, 474, 64-67.
Li, W.; et al. Ultrafast all-optical graphene modulator, Nano Lett. 2014, 14, 955-959.
Hu, Y. T.; et al. Broadband 10 Gb/s operation of graphene electro-absorption modulator on silicon, Laser Photon. Rev. 2016, 10 ( 2) 307-316.
Kim, K.; et al. A role for graphene in silicon-based semiconductor devices, Nature 2011, 479, 338-344.
Bhimanapate, G. R.; et al. Recent Advances in Two Dimensional Materials Beyond Graphene, ACS Nano 2015, 9, 11509.
Dalir, H; et al. Athermal Broadband Graphene Optical Modulator with 35 GHz Speed, ACS Photonics, 2016, 3 (9), pp. 1564-1568.
Reed, G. T.; et al. Silicon optical modulators, J. Nat. Photonics 2010, 4 (8), 518-526.
International Search Report and Written Opinion for International Application No. PCT/US2012/034418 dated Jul. 30, 2012.

* cited by examiner

DOUBLE-LAYER GRAPHENE OPTICAL MODULATORS AND METHODS OF FABRICATION THEREOF

RELATED APPLICATIONS

This application claims priority to U.S. Provisional Patent Application No. 62/550,063, filed Aug. 25, 2017, which is herein incorporated by reference.

STATEMENT OF GOVERNMENT SUPPORT

This invention was made with government support under Contract No. DE-AC02-05CH11231 awarded by the U.S. Department of Energy and under Grant No. N00014-13-1-0678 awarded by the Office of Naval Research (ONR) MURI program. The government has certain rights in this invention.

TECHNICAL FIELD

This disclosure relates generally to optical modulators and more particularly to optical modulators including graphene.

BACKGROUND

To boost the development of future supercomputers and data centers, ideal optical modulators with ultrahigh speed, small footprint, large optical bandwidth, athermal operation, and complementary metal-oxide semiconductor (CMOS) compatibility are needed. Modulators are classified in two operational categories: electrorefractive and electroabsorptive. For the refractive approach, the modulation is typically achieved by varying the plasma dispersion effect and free carrier absorption in silicon to control the real part of material permittivity. However, for a single-pass two-beam interference like Mach-Zehnder's, such a change is typically poor. Hence, a device several hundreds of micrometers long must be employed to manipulate the relative phase of the interfering beams for output power control. This results in a large footprint and a high capacitance, which consequently raises the power consumption. Other refractive modulator designs with multiple-pass single-beam interference, such as resonators, require a large quality factor (>10$^4$) or a narrowband modulation (<0.1 nm), which results in a stringent fabrication process. In addition, precise temperature stabilization to keep the device on resonance is needed, causing an increase in the total power consumption.

In contrast, absorptive modulators (such as germanium-based devices) utilize the changes of the imaginary part of the material permittivity by applying an electrical field through the structure, mostly with a reverse bias voltage on a p-i-n-like structure. The electroabsorption effect of germanium has offered a high modulation speed but with a limited optical bandwidth due to finite band gap. As a result, it cannot cover the entire optical communication regime (1525-1565 nm (C band) and 1570-1610 nm (L band)). Furthermore, CMOS-compatible applications require special processes (such as epitaxial growth, wafer bonding, or die bonding), which limits the thermal stability of the final devices.

SUMMARY

One innovative aspect of the subject matter described in this disclosure can be implemented in a device including a substrate, a first electrically insulating material disposed over the substrate, a first graphene layer and a second graphene layer disposed in the first electrically insulating material and being separated by the first electrically insulating material, and a waveguide disposed on the first electrically insulating material. At least a portion of the second graphene layer overlays at least a portion of the first graphene layer. The waveguide overlays both the first graphene layer and the second graphene layer.

Another innovative aspect of the subject matter described in this disclosure can be implemented in a method including depositing a first electrically insulating material on a substrate. A first graphene layer is deposited on the first electrically insulating material. A first electrode is deposited on a portion of the first graphene layer. The first electrically insulating material is deposited on the first graphene layer. A second graphene layer is deposited on the first electrically insulating material after the first electrically insulating material is deposited on the first graphene layer. A second electrode is deposited on a portion of the second graphene layer. The first electrically insulating material is deposited on the second graphene layer. A waveguide is formed on the first electrically insulating material after the first electrically insulating material is deposited on the second graphene layer.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a value is close to a targeted value, where close can mean, for example, the value is within 80% of the targeted value, within 90% of the targeted value, within 95% of the targeted value, or within 99% of the targeted value.

Graphene, a monolayer of carbon atoms formed in a honeycomb lattice, is appealing for optical modulation applications due to its unique electrical and optoelectronic properties. Among these are: (1) ultrafast modulation speed (several hundreds of GHz), due to its high carrier mobility of more than 200,000 $cm^2/(V·s)$; (2) broadband operation with a constant absorption of $\pi e^2/\hbar c = 2.293\%$, where $\hbar$ and c are the Plank constant and speed of light in a bulk material, which covers a broad range from visible to infrared wavelengths; (3) CMOS compatibility with the demonstrated wafer-scale integration on silicon; and (4) unique temperature stability related to its exceptional thermal conductivity. With all of these merits, graphene is expected to be integrated with silicon photonics for the next generation of short-reach optical interconnects.

Described herein is a graphene-based electroabsorption modulator with a 35 GHz modulation speed, with absorption being actively controlled by tuning the Fermi level through electrical gating of a graphene double layer. A 2 dB modulation depth within the range of optical communication wavelengths (1500 nm to 1640 nm), under ambient conditions, was obtained. It was also shown that the modulation performance of the device remains immune to a large range of changes in the temperature (25° C. to 145° C.). This is important for practical interconnections and communication systems.

To facilitate high-speed and broadband operation, a planar structure was developed by locating the double-layer graphene underneath the waveguide. This new design allows for a 10 times thicker spacer layer between the graphene layers compared to the previous work to reduce the device capacitance. The contact resistivity was improved using rapid thermal annealing (RTA). These led to a more than 1-order enhancement of the modulation speed.

Figure 1:
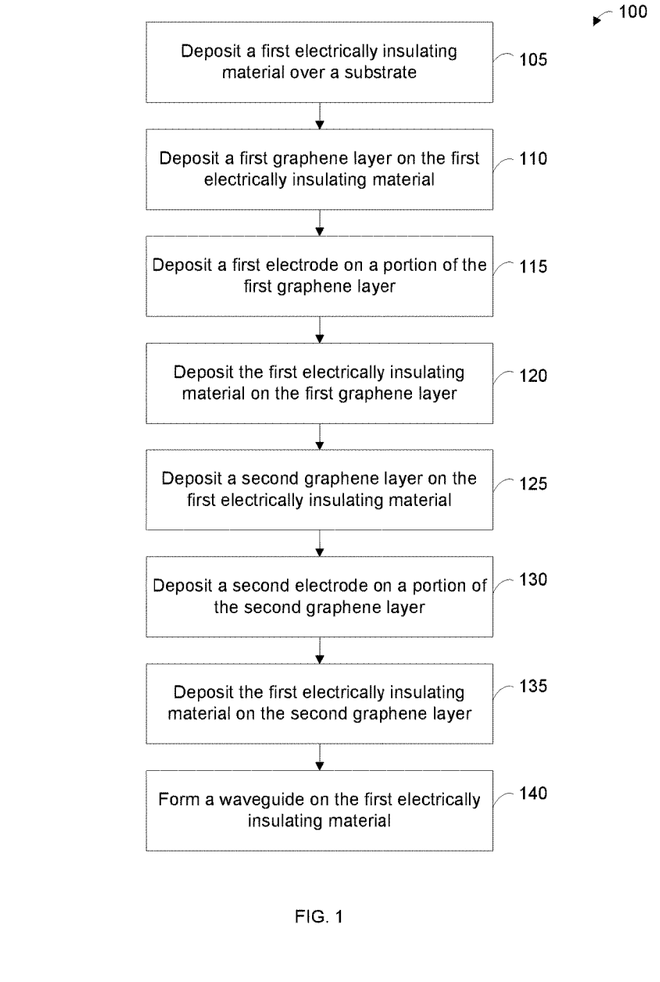
FIG. 1 shows an example of a flow diagram illustrating a manufacturing process for a double-layer graphene modulator.

FIG. 1 shows an example of a flow diagram illustrating a manufacturing process for a double-layer graphene modulator. FIGS. 2A-2E show examples of schematic illustrations of a double-layer graphene modulator at various stages in the manufacturing process. Patterning techniques, including masking as well as etching processes, may be used to define the shapes of the different components during the fabrication of a double-layer graphene modulator. For example, electron-beam (e-beam) lithography may be used to remove material during the fabrication process.

Starting at block 105 of the process 100 shown in FIG. 1, a first electrically insulating material is deposited over a substrate. The first electrically insulating material may be deposited using a number of different techniques. In some embodiments, the first electrically insulating material is deposited using atomic layer deposition (ALD), chemical vapor deposition (CVD), or physical vapor deposition (PVD). In some embodiments, the first electrically insulating material comprises an oxide. For example, the first electrically insulating material may comprise aluminum oxide ($Al_2O_3$), hafnium oxide, titanium dioxide, silicon dioxide, tungsten oxide, cobalt oxide, or zirconium oxide. In some embodiments, the first electrically insulating material comprises a nitride (e.g., silicon nitride or aluminum nitride), an electronic resin (e.g., benzocyclobutene (BCB)), a polymer (e.g., poly(methyl methacrylate) (PMMA)), or hydrogen silsesquioxane (HSQ).

The substrate may comprise a number of different materials. In some embodiments, the substrate comprises a material that has a lower index of refraction than a material of the waveguide. In some embodiments, the substrate comprises an insulating material. The substrate may be rigid or flexible. For example, the substrate may comprise an oxide (e.g., $SiO_2$), a nitride, or a polymer film (e.g., a polyimide film, such as Kapton tape). When the substrate comprises an electrically insulating material, the first electrically insulating material may be deposited on the substrate. When the substrate does not comprise an electrically insulating material, an electrically insulating material may be deposited or formed on the substrate and then the first electrically insulating material may be deposited on the electrically insulating material. For example, when the substrate comprises silicon, a layer of silicon oxide ($SiO_2$) may be deposited on the substrate prior to block 105.

At block 110, a first graphene layer is deposited on the first electrically insulating material. In some embodiments, the graphene is grown using a CVD process and then transferred onto the first electrically insulating material (e.g., using a wet transfer process). In some embodiments, the first graphene layer comprises or consists of a single layer of carbon atoms.

Figure 2A:
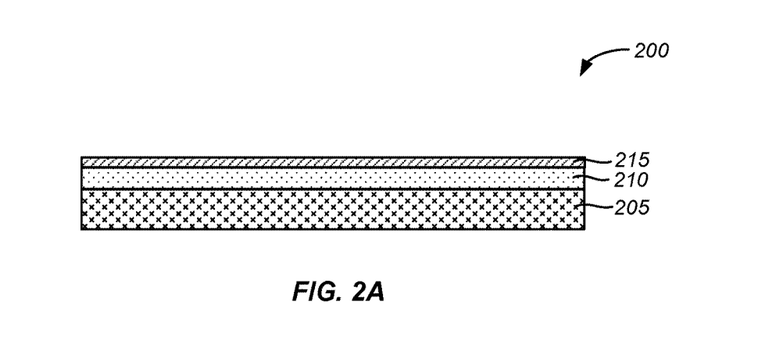
FIGS. 2A-2E show examples of schematic illustrations of a double-layer graphene modulator at various stages in the manufacturing process.

FIG. 2A show an example of a cross-sectional schematic illustration of a partially fabricated graphene modulator 200 at this point (e.g., up through block 110) in the process 100. The graphene modulator 200 shown in FIG. 2A includes a substrate 205, a first electrically insulating material 210 disposed on the substrate 205, and a first graphene layer 215 disposed on the first electrically insulating material 210.

At block 115, a first electrode is deposited on a portion of the first graphene layer. In some embodiments, the first electrode comprises a metal. In some embodiments, the first electrode comprises a chromium, palladium, and gold alloy. In some embodiments, the first electrode is deposited using ALD, CVD, or PVD. For example, the first electrode may be deposited using electron-beam (e-beam) evaporation.

Figure 2B:
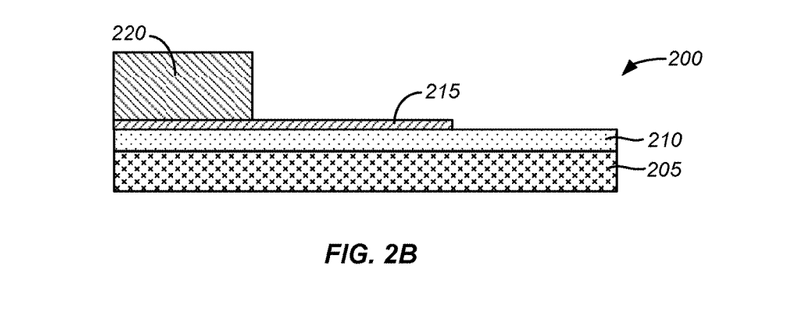

FIG. 2B show an example of a cross-sectional schematic illustration of the partially fabricated graphene modulator 200 at this point (e.g., up through block 115) in the process 100. The graphene modulator 200 includes the substrate 205, the first electrically insulating material 210, the first graphene layer 215, and a first electrode 220 disposed on a portion of the first graphene layer 215. In some embodiments, as shown in FIG. 2B, a portion of the first graphene layer 215 is removed from the first electrically insulating material 210 either before or after block 115.

At block 120, the first electrically insulating material is deposited on the first graphene layer. In some embodiments, the first electrically insulating material is deposited using ALD, CVD, or PVD. In some instances, it may be difficult to deposit the first electrically insulating material on the first graphene layer due to graphene being hydrophobic. In some embodiments, a PVD technique is used to deposit a thin layer of the first electrically insulating material on the graphene and then ALD or CVD is used to deposit further first electrically insulating material to a specified thickness. For example, when depositing $Al_2O_3$ on graphene, a 1 nm to 2 nm thick layer of $Al_2O_3$ may first be evaporated on the graphene, and then ALD may be used to deposit $Al_2O_3$ to a specified thickness. In some embodiments, a thin layer of electrically insulating material that is not of the same composition as the first electrically insulating material is deposited before depositing the first electrically insulating material.

Figure 2C:
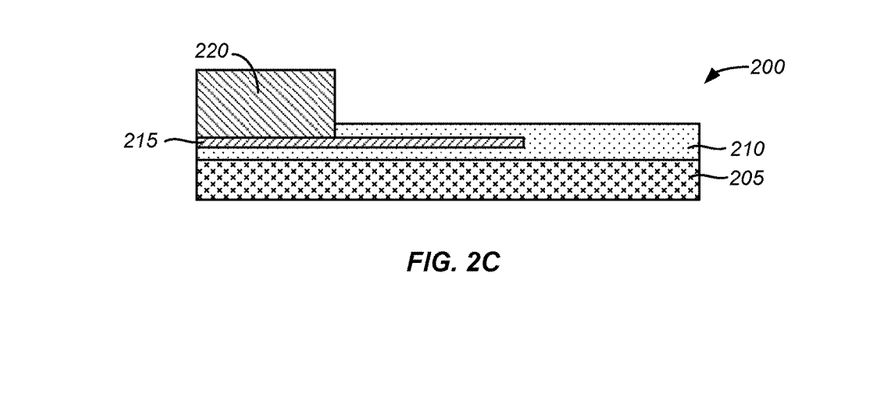

FIG. 2C show an example of a cross-sectional schematic illustration of the partially fabricated graphene modulator 200 at this point (e.g., up through block 120) in the process 100. The graphene modulator 200 includes the substrate 205, the first electrically insulating material 210 with the first electrically insulating material 210 disposed on the first graphene layer 215, the first graphene layer 215, and the first electrode 220.

Returning to FIG. 1, after block 120, at block 125 a second graphene layer is deposited on the first electrically insulating material. The second graphene layer may be deposited on the first electrically insulating material using a similar or the same process described at block 110 with respect to the first graphene layer. In some embodiments, the second graphene layer comprises or consists of a single layer of carbon atoms.

At block 130, a second electrode is deposited on a portion of the second graphene layer. The second electrode may be deposited using a similar or the same process described at block 115 with respect to the first electrode.

Figure 2D:
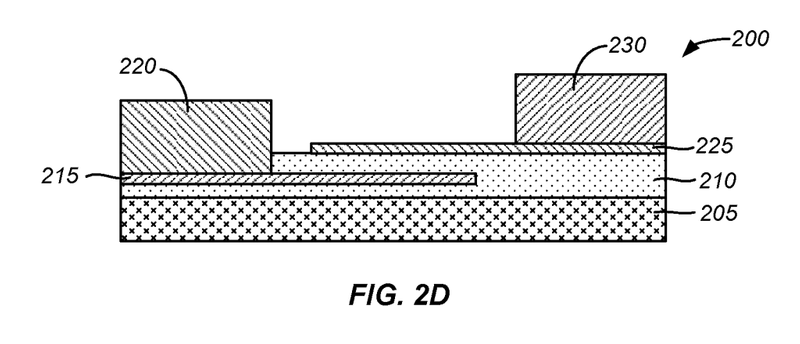

FIG. 2D show an example of a cross-sectional schematic illustration of the partially fabricated graphene modulator 200 at this point (e.g., up through block 130) in the process 100. The graphene modulator 200 includes the substrate 205, the first electrically insulating material 210, the first graphene layer 215, the first electrode 220, a second graphene layer 225 disposed on the first electrically insulating material 210, and a second electrode 230 disposed on a portion of the second graphene layer 225.

At block 135, the first electrically insulating material is deposited on the second graphene layer. The first electrically insulating material may be deposited using a similar or the same process described at block 120.

Figure 2E:
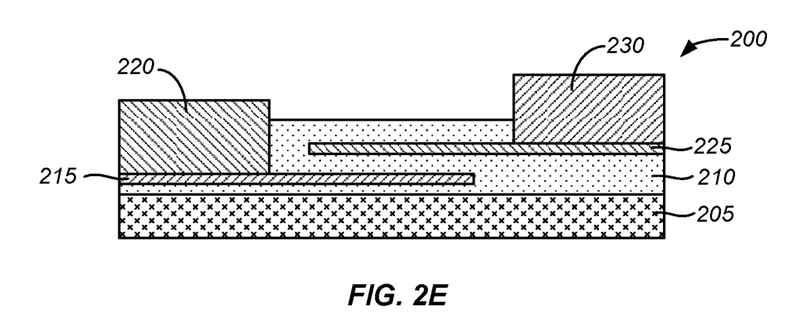

FIG. 2E show an example of a cross-sectional schematic illustration of the partially fabricated graphene modulator 200 at this point (e.g., up through block 135) in the process 100. The graphene modulator 200 includes the substrate 205, the first electrically insulating material 210 with the first electrically insulating material 210 disposed on the second graphene layer 225, the first graphene layer 215, the first electrode 220, the second graphene layer 225, and the second electrode 230.

After block 135, at block 140 a waveguide is formed on the first electrically insulating material. In some embodiments, ALD, CVD, or PLD is used to form the waveguide. In some embodiments, plasma-enhanced (PECVD) is used to form the waveguide. In some embodiments, lithography (e-beam lithography) is used to define a shape of the waveguide after the waveguide is deposited. In some embodiments, the waveguide comprises a material selected from a group consisting of silicon, silicon nitride ($Si_3N_4$), a chalcogenide glass, and a polymer. A chalcogenide glass is a glass containing one or more chalcogens (sulfur, selenium, and tellurium, but excluding oxygen). Examples of polymers that may be used for the waveguide include a bisphenol A novolac epoxy (SU-8 photoresist) and polyacrylic-tetraphenyldiaminobiphenyl In some embodiments, after block 140, the graphene modulator is annealed with a rapid thermal annealing process. For example, the graphene modulator may be heated to about 200° C. to 500° C., or about 400° C., for about 5 minutes to 15 minutes, or about 10 minutes. The rapid thermal annealing process may decrease the contact resistance between the electrodes and their respective graphene layers.

Figure 3:
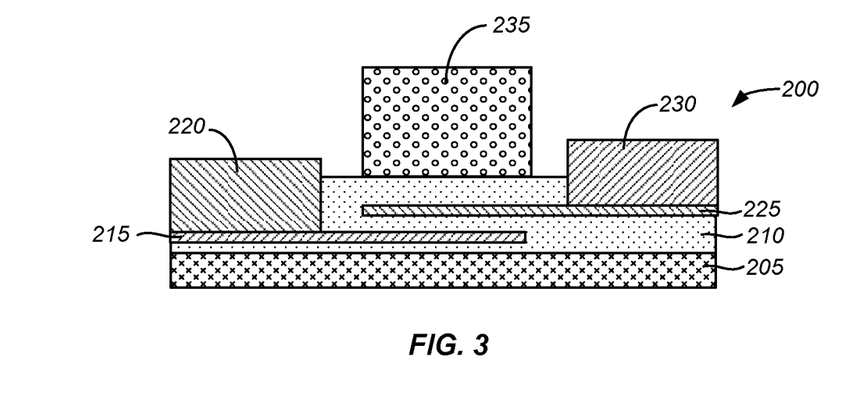
FIG. 3 shows an example of a cross-sectional schematic illustration of a double-layer graphene modulator.
Figure 4:
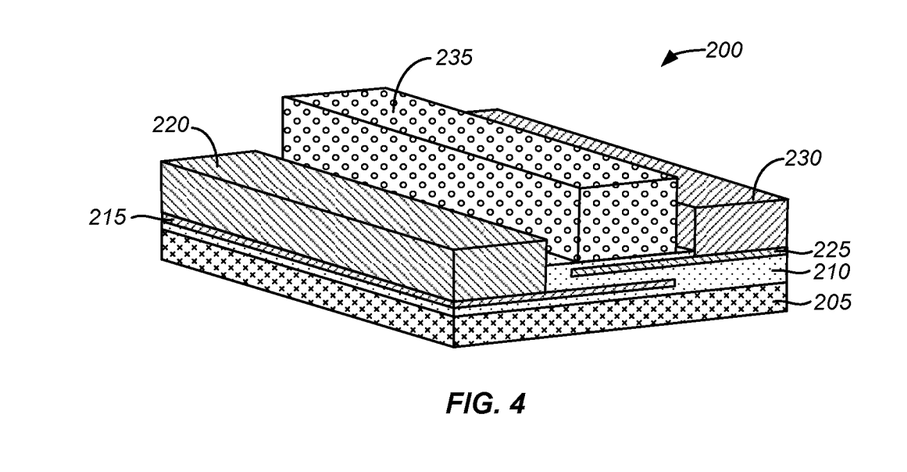
FIG. 4 shows an example of the schematic illustration of a double-layer graphene modulator.

FIG. 3 shows an example of a cross-sectional schematic illustration of a double-layer graphene modulator. FIG. 4 shows an example of the schematic illustration of a double-layer graphene modulator. For example, the double-layer graphene modulators shown in FIGS. 3 and 4 may be formed by process 100 (e.g., up through block 140).

As shown in FIGS. 3 and 4, the double-layer graphene modulator 200 includes the substrate 205, the first electrically insulating material 210, the first graphene layer 215, the first electrode 220, and a second graphene layer 225, the second electrode 230, and the waveguide 235. The first graphene layer 215 and the second graphene layer 225 are disposed in the first electrically insulating material 210 and are separated by the first electrically insulating material 210. At least a portion of the second graphene layer 225 overlays at least a portion of the first graphene layer 215. Further, the first graphene layer 215 is closer to the substrate 205 than the second graphene layer 225.

In some embodiments, a thickness of the first electrically insulating material 210 between the substrate 205 and the first graphene layer 215 is about 10 nanometers (nm) to 20 nm. In some embodiments, a thickness of the first electrically insulating material 210 between the first graphene layer 215 and the second graphene layer 225 is about 5 nm to 150 nm, or about 100 nm. In some embodiments, a thickness of the first electrically insulating material 210 between the second graphene layer 225 and the waveguide 235 is about 10 nm to 20 nm.

The thickness of the first electrically insulating material 210 between the first graphene layer 215 and the second graphene layer 225 affects in part the operating voltage and operation speed of the double-layer graphene modulator 200. With a smaller thickness of the first electrically insulating material 210 (e.g., closer to 5 nm) between the first graphene layer 215 and the second graphene layer 225, the double-layer graphene modulator 200 can operate at a lower voltage. With this smaller thickness of the first electrically insulating material 210, the double-layer graphene modulator 200 will operate at a lower speed (i.e., the speed at which a signal can be modulated will be lower).

As shown in FIGS. 3 and 4, in some embodiments, the first graphene layer 215 and the second graphene layer 225 are substantially parallel to each other. That is, a planar surface of the first graphene layer 215 and a planar surface of the second graphene layer 225 are substantially parallel to each other. The planar surface of the first graphene layer 215 is separated from the planar surface of the second graphene layer 225 by the first electrically insulating material 210.

The first graphene layer 215 and the second graphene layer 225 are not in contact with each other.

In some embodiments, a width of the waveguide 235 is about 100 nm to 10 microns. Here, the width of the waveguide 235 is taken to be the surfaces of the waveguide 235 that are substantially parallel to the first graphene layer 215 and the second graphene layer 225. In some embodiments, a height of the waveguide 235 is about 100 nm to 10 microns. Here, the height of the waveguide 235 is taken to be the surfaces of the waveguide 235 that are substantially perpendicular to the first graphene layer 215 and the second graphene layer 225. In some embodiments, a length of the waveguide is about 1 micron to 1 millimeter. The waveguide 235 is positioned with respect to the first graphene layer 215 and the second graphene layer 225 so that the width of the waveguide 235 overlays both the first graphene layer 215 and the second graphene layer 225. In some embodiments, the waveguide 235 overlays the portions of the first graphene layer 215 and the second graphene layer 225 that overlay each other.

There are further embodiments of the double layer graphene modulator and method of fabrication thereof. For example, when the substrate is an insulator, the first graphene layer may be deposited onto the substrate and then the double layer graphene modulator could be fabricated continuing with blocks 115-140 of the method 100. In a double layer graphene modulator fabricated using such a method, there would be no first electrically insulating material disposed between the first graphene layer and the substrate.

The double layer graphene modulator described above can modulate light of infrared wavelengths. A modulator comprising other layers of two dimensional (2-D) semiconductors can modulate light of different wavelengths. In some embodiments, a modulator comprises a substrate, a first electrically insulating material disposed over the substrate, a first 2-D semiconductor layer and a second 2-D semiconductor layer disposed in the first electrically insulating material and being separated by the first electrically insulating material, and a waveguide disposed on the first electrically insulating material. At least a portion of the second 2-D semiconductor layer overlays at least a portion of the first 2-D semiconductor layer. The waveguide overlays both the first 2-D semiconductor layer and the second 2-D semiconductor layer. In some embodiments, a modulator including two 2-D semiconductor layers is the same as or similar to the graphene modulators described above, with the substitution of the graphene layers with the 2-D semiconductor layers.

In some embodiments, the first and the second 2-D semiconductor layers are selected from a group consisting of molybdenum disilicide ($MoSi_2$), black phosphorine, and graphene. A waveguide comprising molybdenum disilicide could be used to modulate visible light (i.e., visible to humans). A waveguide comprising black phosphorine could be used to modulate infrared light.

EXAMPLE

The following examples are intended to be examples of embodiments disclosed herein, and are not intended to be limiting. The double-layer graphene modulator used in the experiments described below was fabricated using embodiments described above.

Specifically, in the fabrication of the double-layer graphene optical modulator, wet thermal oxidation and atomic layer deposition (ALD) were employed to form a 1 μm silica layer and a 20 nm thick $Al_2O_3$ layer, respectively. These layers prevent the leakage of the optical mode into the silicon substrate. Next, chip-sized graphene grown on copper was transferred to the $Al_2O_3$ layer using a wet transfer method. The electrode and a contact pad for the bottom graphene layer were defined by e-beam and UV lithography, respectively, followed by e-beam evaporation of Cr/Pd/Au with a thickness of 2 nm/10 nm/90 nm. During the RTA process, the sample was ramped in 30 seconds to 300° C. and stabilized at 300° C. for about 1 minute with gas of 10% hydrogen in nitrogen flowing into the chamber. This was repeated five times. The graphene was patterned by e-beam lithography. Oxygen plasma was used to remove the undesired graphene region. It is noted that a pristine graphene with the hydrophobic nature of the basal plane encounters the difficulty in direct deposition of high dielectric constant material through the ALD method. Therefore, a seeding layer of 2 nm thick $Al_2O_3$ was deposited onto the bottom graphene by e-beam evaporation. The planar design of graphene layers allowed for the formation of an interlayer of 120 nm thick $Al_2O_3$ with ALD for ultrafast optoelectric uses. The top graphene layer was then transferred, forming a capacitor structure. Similar procedures to those for the bottom graphene layer were performed to allow the active tuning of graphene layers. A 270 nm thick layer of amorphous silicon (a-Si) was deposited by PECVD. A 600 nm×30 μm (width×length) silicon waveguide, with both ends connected to a pair of grating couplers (period=870 nm, optimized for transverse magnetic (TM) mode with λ=1550 nm) was fabricated via e-beam lithography and transformer coupled plasma (TCP) etching. The results of a two-dimensional finite element method (FEM) simulation indicated that the absorption of the TM mode (0.1 dB/μm) is greater than the transverse electric (TE) mode due to its better overlap with graphene, and a 3 dB modulation depth is expected from the device geometry.

To study the dynamic response of a double-layer graphene modulator, an unmodulated RF signal with −7 dBm from a vector network analyzer (VNA) was combined with a bias direct current (dc) voltage of 25 V through a bias-tee and applied between the bottom and top layers of graphene. The coaxial cable was connected to the device with a microwave probe. Losses from the cabling, bias-tee, and probe were subtracted. A distributed feedback (DFB) laser at 1550 nm was used to externally generate the light into the modulator. The radiofrequency (RF)-modulated signal was then transferred to the VNA via a photodiode cascaded with a broadband postamplifier.

Figure 5:
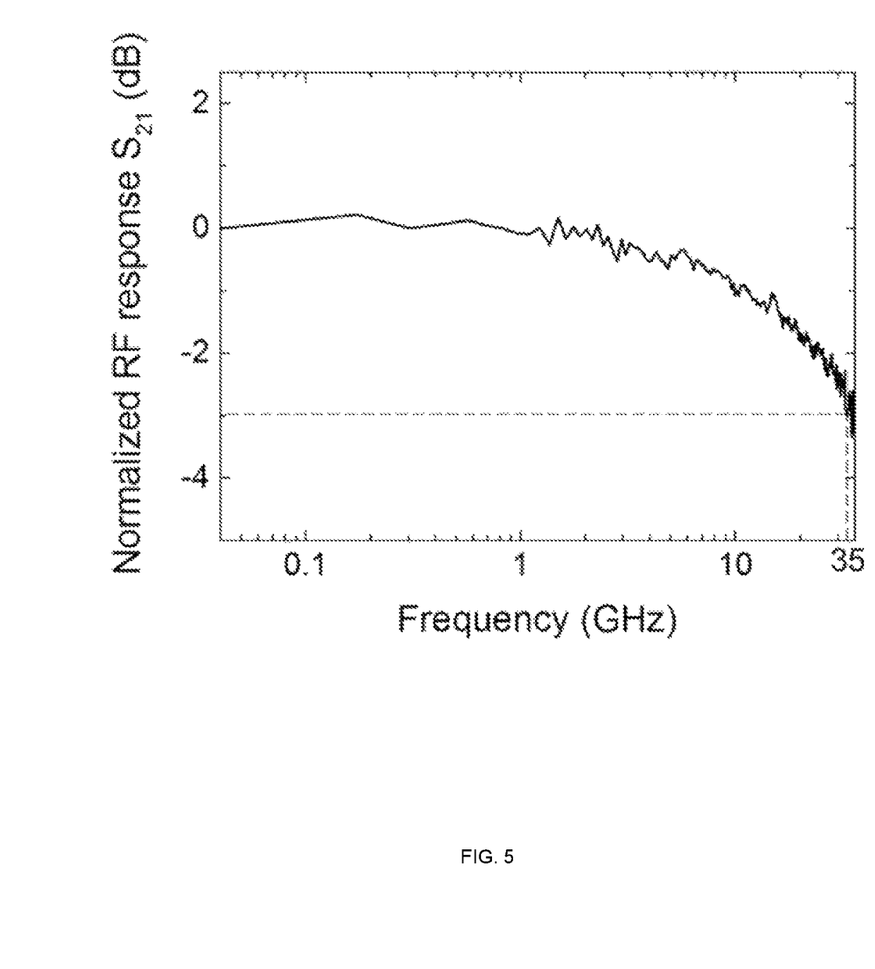
FIG. 5 shows the radio frequency response of the device. The 3 dB cut-off frequency of 35 GHz was obtained with an RF power of −7 dBm biased at $V_{DC}$=25 V.

The small-signal RF (S21: ratio between the optical amplitude modulation and the RF signal) was measured. FIG. 5 illustrates the S21 results, and a bandwidth of 35 GHz limited by the RC time constant of the fabricated modulator was obtained. The RC is restricted by the dimension of the capacitor, graphene sheet resistance, and contact resistance. An estimation of the measured device's geometric capacitance is 9 fF. The measurement revealed that the high series resistance (~500Ω) mainly came from the contact resistance between the graphene layer and palladium electrode (pad), which is an issue for the current speed limitation. Using state-of-the-art processes, the series resistance of the device can be considerably reduced to below 50 ohm, which combined with a microstrip electrode design terminated with a matched impedance can significantly increase the speed of the modulator.

Figure 6:
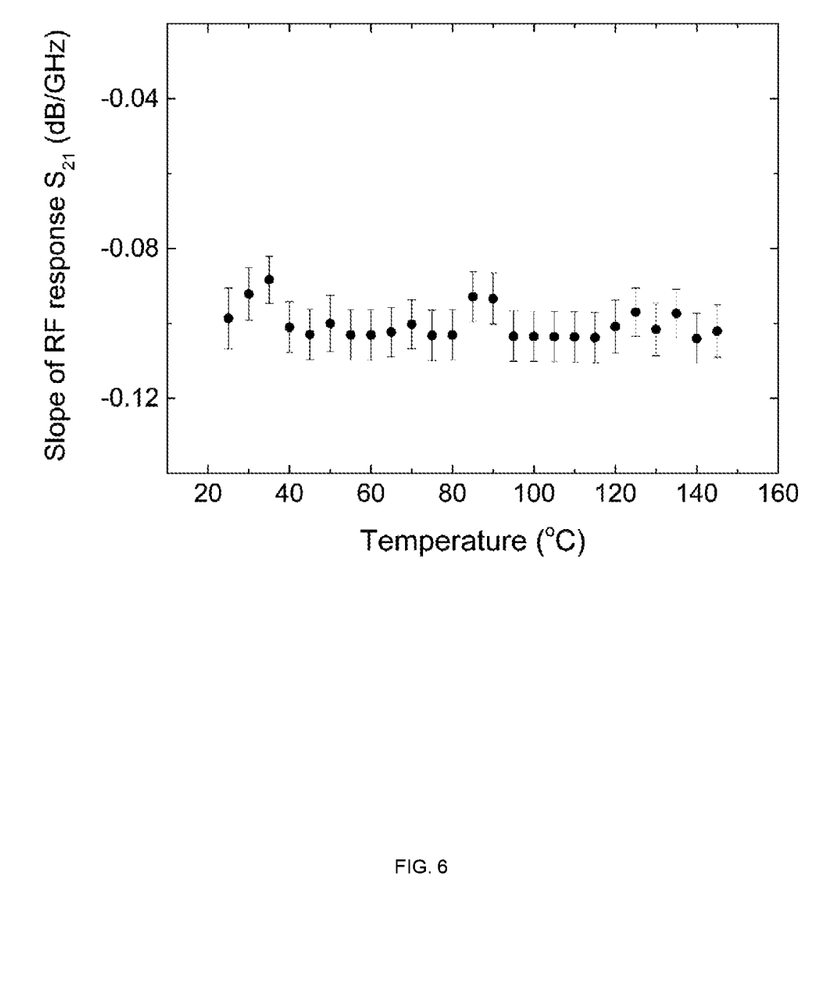
FIG. 6 shows the athermal operation of the graphene modulator under a large temperature range.

Typically, interference-based silicon devices such as resonators or Mach-Zehnders are highly sensitive to high-temperature operation due to the large thermo-optic coefficient effect in silicon. To study the temperature dependence of the operating characteristics, the 30-μm-long waveguide modulator was tested throughout a temperature range of 25° C. to 145° C. The slope of the RF response ($S_{21}$) at 1550 nm was studied throughout the temperature range. As shown in FIG. 6, the slope virtually remains unchanged as the temperature rises, which denotes a robust speed performance. In addition, a 1.9 dB modulation depth at a high temperature of 145° C. with the same swing voltage was obtained, indicating less dependency on the temperature change. The robust athermal operation in modulators is important to optoelectric interconnection and communication systems for ultrafast efficient modulation.

Figure 7A:
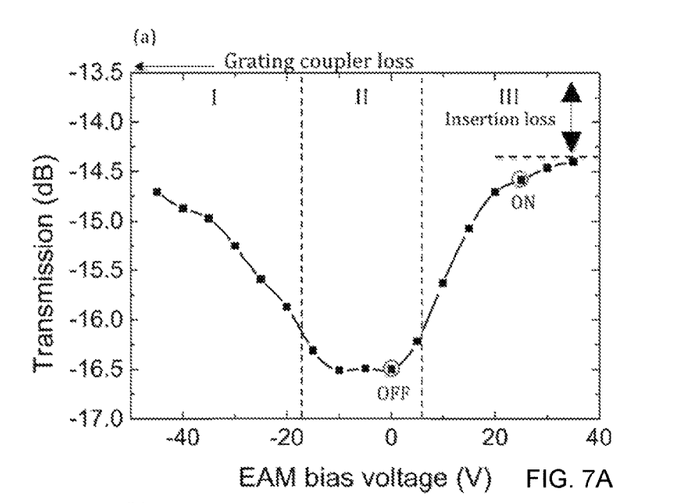
FIG. 7A shows the static result of a planar double-layer graphene modulator. A modulation depth of ~2 dB was achieved on a 30 μm long device with a swing voltage of 25 V at the standard optical wavelength of 1.55 μm.

The static results on the transmission of the graphene waveguide modulator with various bias voltages were measured at the standard communication wavelength of 1550 nm, the results of which are shown in FIG. 7A. While most of the transmission loss comes from the two grating couplers (−13.5 dB for both couplers), the minimum transmission of the waveguide is −16.4 dB, at which 2 dB modulation depth with TM mode excitation was obtained for a 30-μm-long waveguide modulator. A low insertion loss of −0.9 dB was measured by comparing the output of two identical waveguides with and without graphene layers. Applying a voltage swing of 25 V to the modulator was required to turn the modulator from the OFF to ON state and vice versa, which corresponds to a power consumption of 1.4 pJ/bit.

The absorption of graphene is adjusted by the electrical gating. The band structure of graphene is composed of two bands that are degenerate at the so-called Dirac points. Due to the nature of the monolayer (low density of states), the position of the Fermi level can be modified readily by changing the accumulation charge. Considering undoped monolayer graphene (region II of FIG. 7A), the Fermi level is at the Dirac point. Under the illumination of photons with an energy of $\hbar v$ (where $\hbar$ and v are the Plank and light frequency, respectively), the transmission would be attenuated. However, when the graphene sheet is either hole- or electron-doped (regions I and III of FIG. 7A), its Fermi level drops or rises, respectively. When the charging is sufficient to raise (or drop) the Fermi level by the photon's half energy above (or below) the Dirac point, the interband transition is suppressed, and hence higher transmission is allowed. In the tested device, when a positive voltage is applied to the top layer (bottom layer is effectively negatively biased), a less positive voltage is needed to suppress the absorption compared with the negative voltage case. This is because the absorption is mainly from the top layer graphene, which is closer to the waveguide mode, and that layer is initially p-doped.

Figure 7B:
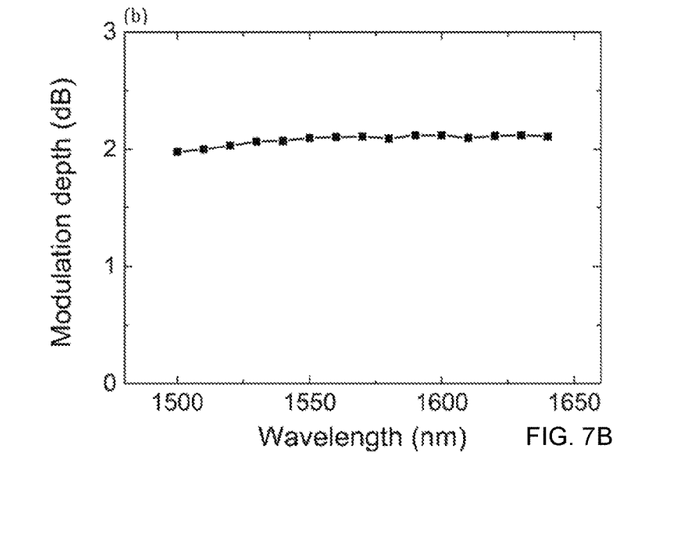
FIG. 7B shows the uniform modulation depth of the device across the full measured wavelength range from 1500 nm to 1640 nm covering the entire optical communication region (1525-1565 nm (C band) and 1570-1610 nm (L band)) observed with a fixed swing voltage. Such a broadband functionality in a modulator is important to boost the capacity of optical short-reach interconnects.

The optical bandwidth of the double-layer graphene device was examined in a large range of optical communication wavelengths. A uniform modulation depth under different optical wavelengths (1500 nm to 1640 nm) was observed with a constant swing voltage, as shown in FIG. 7B. Such a broadband functionality in a modulator is important to boost the capacity of optical short-reach interconnects.

CONCLUSION

Further details regarding the embodiments described herein can be found in H. Dalir et al., "Athermal Broadband Graphene Optical Modulator with 35 GHz Speed," ACS Photonics, 2016, 3 (9), pp 1564-1568, which is herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A device comprising:
   a substrate;
   a first electrically insulating material disposed over the substrate;
   a first graphene layer and a second graphene layer disposed in the first electrically insulating material and being separated by the first electrically insulating material, a thickness of the first electrically insulating material between the first graphene layer and the second graphene layer being 120 nanometers, at least a portion of the second graphene layer overlaying at least a portion of the first graphene layer; and
   a waveguide disposed on the first electrically insulating material, the waveguide overlaying both the first graphene layer and the second graphene layer.

2. The device of claim 1, wherein the first graphene layer and the second graphene layer each consist of a single layer of carbon atoms.

3. The device of claim 1, further comprising
   a first electrode in contact with the first graphene layer; and
   a second electrode in contact with the second graphene layer.

4. The device of claim 3, wherein the first electrode and the second electrode each comprise a metal.

5. The device of claim 1, wherein the first electrically insulating material comprises $Al_2O_3$.

6. The device of claim 1, wherein a thickness of the first electrically insulating material between the substrate and the first graphene layer is about 10 nanometers to 20nanometers.

7. The device of claim 1, wherein the first graphene layer and the second graphene layer are substantially parallel to each other.

8. The device of claim 1, wherein a width of the waveguide is substantially parallel to the first graphene layer and the second graphene layer.

9. The device of claim 1, wherein the waveguide comprises a material selected from a group consisting of silicon, silicon nitride, a chalcogenide glass, and a polymer.

10. The device of claim 1, wherein a width of the waveguide is about 100 nanometers to 10 microns, wherein a height of the waveguide is about 100 nanometers to 10 microns, and wherein a length of the waveguide is about 1 micron to 1 millimeter.

11. The device of claim 1, wherein the substrate comprises an insulating material.

12. The device of claim 1, wherein the substrate comprises a material selected from a group consisting of an oxide, a nitride, and a polymer film.

13. The device of claim 1, wherein the substrate has a lower index of refraction than the waveguide.

14. A device comprising:
   a substrate;
   a first electrically insulating material disposed over the substrate;
   a first 2-D semiconductor layer and a second 2-D semiconductor layer disposed in the first electrically insulating material and being separated by the first electrically insulating material, a thickness of the first electrically insulating material between the first 2-D semiconductor layer and the second 2-D semiconductor layer being 120 nanometers, at least a portion of the second 2-D semiconductor layer overlaying at least a portion of the first 2-D semiconductor layer; and a waveguide disposed on the first electrically insulating material, the waveguide overlaying both the first 2-D semiconductor layer and the second 2-D semiconductor layer.

15. The device of claim 14, wherein the first and the second 2-D semiconductor layers are selected from a group consisting of molybdenum disilicide, black phosphorine, and graphene.

16. (Withdrawn, Currently Amended) A method comprising:
(a) depositing a first electrically insulating material over a substrate;
(b) depositing a first graphene layer on the first electrically insulating material;
(c) depositing a first electrode on a portion of the first graphene layer;
(d) depositing the first electrically insulating material on the first graphene layer;
(e) after operation (d), depositing a second graphene layer on the first electrically insulating material;
(f) depositing a second electrode on a portion of the second graphene layer;
(g) depositing the first electrically insulating material on the second graphene layer; and
(h) after operation (g), forming a waveguide on the first electrically insulating material, a resulting device comprising:
the substrate;
the first electrically insulating material disposed over the substrate;
the first graphene layer and the second graphene layer disposed in the first electrically insulating material and being separated by the first electrically insulating material, a thickness of the first electrically insulating material between the first graphene layer and the second graphene layer being 120 nanometers, at least a portion of the second graphene layer overlaying at least a portion of the first graphene layer; and
the waveguide disposed on the first electrically insulating material, the waveguide overlaying both the first graphene layer and the second graphene layer.

17. The method of claim 16, further comprising:
after operation (h), annealing the substrate and the depositions thereon at about 200° C. to 500° C. for about 5 minutes to 15 minutes.

18. The method of claim 16, wherein the waveguide overlays both the first graphene layer and the second graphene layer.

* * * * *